United States Patent
Marks et al.

(10) Patent No.: US 9,336,124 B2
(45) Date of Patent: May 10, 2016

(54) AUTOMATIC REMOTE EXECUTION OF AN APPLICATION

(71) Applicant: Apple Inc., Cupertino, CA (US)

(72) Inventors: Paul Marks, San Jose, CA (US); Jonathan Deutsch, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 14/191,036

(22) Filed: Feb. 26, 2014

(65) Prior Publication Data

US 2014/0245289 A1    Aug. 28, 2014

Related U.S. Application Data

(60) Provisional application No. 61/770,967, filed on Feb. 28, 2013.

(51) Int. Cl.
| | |
|---|---|
| *G06F 9/44* | (2006.01) |
| *G06F 9/445* | (2006.01) |
| *G06F 11/36* | (2006.01) |

(52) U.S. Cl.
CPC .............. *G06F 11/3664* (2013.01); *G06F 8/61* (2013.01); *G06F 11/3688* (2013.01)

(58) Field of Classification Search
CPC ............ G06F 11/3664; G06F 11/3684; G06F 11/3688; G06F 8/61; G06F 9/4411
USPC .................................................. 717/124, 176
See application file for complete search history.

(56) References Cited

U.S. PATENT DOCUMENTS

| | | | |
|---|---|---|---|
| 6,865,731 B2 | 3/2005 | Davia et al. | |
| 7,469,359 B2 | 12/2008 | Somogyvari et al. | |
| 7,526,410 B2 * | 4/2009 | Anastassopoulos et al. | . 702/186 |
| 7,945,899 B2 * | 5/2011 | Rovang | 717/124 |
| 8,095,636 B2 | 1/2012 | Linville et al. | |
| 8,315,655 B1 | 11/2012 | Cole | |
| 2001/0054161 A1 * | 12/2001 | Wooddruff | 714/27 |
| 2005/0172268 A1 * | 8/2005 | Kuturianu et al. | 717/124 |
| 2012/0204153 A1 | 8/2012 | Peterson et al. | |
| 2013/0212559 A1 * | 8/2013 | Lehtimaki et al. | 717/109 |

* cited by examiner

*Primary Examiner* — Anna Deng
(74) *Attorney, Agent, or Firm* — Blakely, Sokoloff, Taylor & Zafman LLP

(57) ABSTRACT

Disclosed is a method of preparing and launching a test application on a first machine that is automatically executed on a second machine. A developer can prepare a test application on the first machine, and instead of the developer performing multiple steps to copy the test program to a second machine and set up the test environment, the method can automatically detect test environment data, and transmit the test application and the test environment data. Test environment data can include the directory of where the test program should be installed and executed. The test application can be run on the second machine and the results can be returned to the first machine where they can be displayed to the developer.

16 Claims, 5 Drawing Sheets

AUTOMATIC REMOTE EXECUTION OF AN APPLICATION

CROSS REFERENCE TO RELATED APPLICATIONS

This application claims the benefit of U.S. Provisional Patent Application No. 61/770,967, entitled "AUTOMATIC REMOTE EXECUTION OF AN APPLICATION," filed on Feb. 28, 2013, which is incorporated herein by reference in its entirety.

TECHNICAL FIELD

The present technology pertains to executing an application on a remote device, and more specifically pertains to preparing and launching a test application on a first device that is automatically executed on a second device.

BACKGROUND

Application testing can be a tedious process that often necessitates executing a test on a remote device. For example, a test can be composed on a source device that is executing a first operating system, but it may be necessary to perform the test on a number of different operating systems or different configurations. One option could be reconfigure the source device and/or install the different operating systems, but an easier approach may be to have remote systems already configured. To run the test on the remote devices, the test must be manually copied to the remote devices. In another example, it may be undesirable to execute the test on the source device because it could result in changing the configuration of the source device, e.g. installing new files, deleting files, changing settings, etc. In this case, a remote device can be used for the testing and can be reset without disrupting a developer's device.

Often the testing process can require multiple iterations of changing an application and running a test, which can lead to repeatedly manually copying one or more files to the remote device. The repeated manual copying not only involves overhead for the developer, but can also result in costly testing errors. For example, during the testing process a developer may forget to copy a file or update a copy of a file on the remote device. In another example, a developer may manually copy a file to a wrong location. In both of these cases, a developer may waste time trying to identify the source of an unexpected test result.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatically executing an application on a remote device. The automatic remote execution decreases the burden of having to repeatedly manually copy one or more files to a remote device, such as when testing an application. Additionally, the automatic remote execution decreases the chance of developer error that can lead to unexpected test results and wasted debugging times. For example, developer error can occur when a developer forgets to copy a file or update a copy of a file on the remote device, or when a file is copied to a wrong location. To accomplish the automatic remote execution, a testing platform on a first device can be configured to automatically determine test environment data in response to receiving a request to remotely execute a test application. The test environment data can include a variety of data items, such as installation location for the test application, one or more test input files, configuration settings, etc. In some cases, the test environment data can be gathered from command line parameters. However, the test environment data can also be gathered from the testing platform environment, such as the test application installation location or configuration settings.

After the test environment data has been gathered, the testing platform can transmit the test application and the test environment data to the remote device thus causing the test application to be installed on the remote device based on the test environment data. For example, the test application can be installed at a location on the remote device based on an installation location specified in the test environment data. In another example, the testing platform can cause one or more configuration values to be set based on configuration information specified in the test environment data. Once the test application and any supporting data has been installed/configured, the testing platform can cause the test application to be executed on the remote device, such as by sending a run or execute command to the remote device. Any output data from the test application executing on the remote device can be displayed on the local device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a way to prepare and launch a test on a local device and have that test automatically executed on a remote device without requiring a developer to manually copy the test application and any associated files to the remote device. The disclosure first sets forth a discussion of a basic general purpose system or computing device in FIG. 1A and 1B that can be employed to practice the concepts disclosed herein before returning to a more detailed description of automatically executing a test application on a remote device.

Figure 1A:
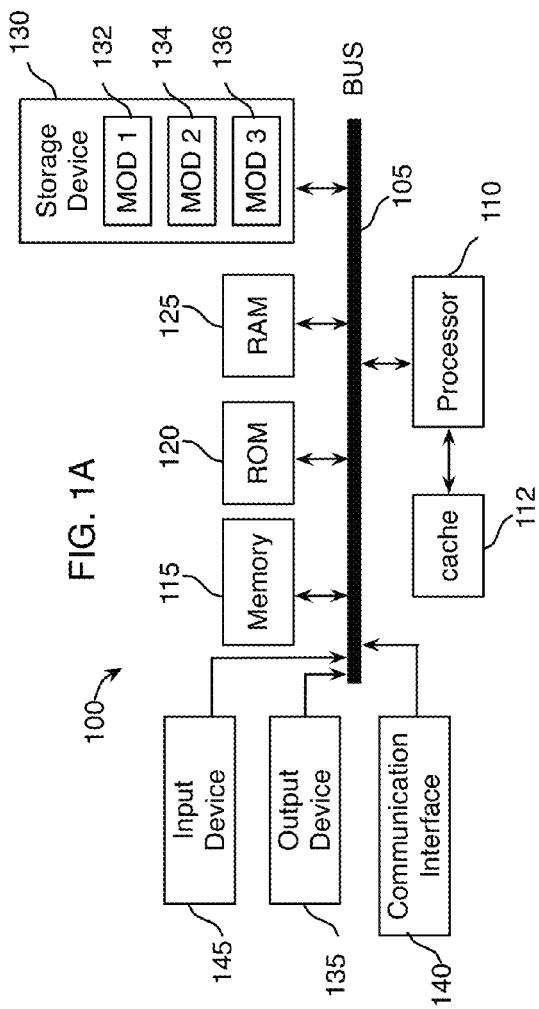
FIGS. 1A and 1B illustrate an exemplary configuration of devices and a network.
Figure 1B:
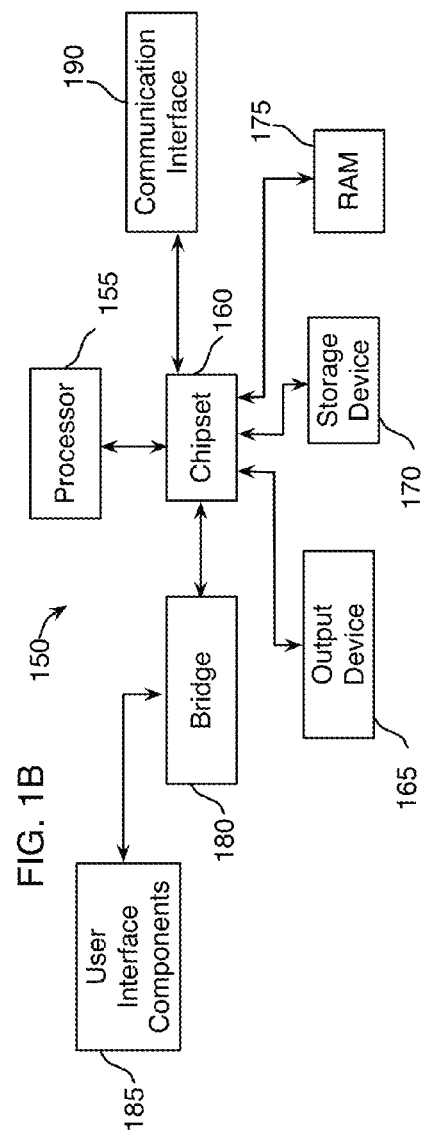

FIG. 1A and FIG. 1B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 1A illustrates a conventional system bus computing system architecture 100 wherein the components of the system are in electrical communication with each other using a bus 105. Exemplary system 100 includes a processing unit (CPU or processor) 110 and a system bus 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

FIG. 1B illustrates a computer system 150 having a chipset architecture that can be used in executing the described method and generating and displaying a graphical user interface (GUI). Computer system 150 is an example of computer hardware, software, and firmware that can be used to implement the disclosed technology. System 150 can include a processor 155, representative of any number of physically and/or logically distinct resources capable of executing software, firmware, and hardware configured to perform identified computations. Processor 155 can communicate with a chipset 160 that can control input to and output from processor 155. In this example, chipset 160 outputs information to output 165, such as a display, and can read and write information to storage device 170, which can include magnetic media, and solid state media, for example. Chipset 160 can also read data from and write data to RAM 175. A bridge 180 for interfacing with a variety of user interface components 185 can be provided for interfacing with chipset 160. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 160 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

It can be appreciated that exemplary systems 100 and 150 can have more than one processor 110 or be part of a group or cluster of computing devices networked together to provide greater processing capability.

Having disclosed some components of a computing system, the disclosure now turns to a discussion of automatically executing a test application on a remote device. A person skilled in the art will recognize that while the disclosure frequently uses a test application to illustrate the disclosed technology, automatic execution on a remote device can be applied to any type of application that is developed on a local device, but a developer wishes to execute it on a remote device.

To enable the automatic execution of an application on a second device from a first device, the first device can be configured with a computer executable testing platform application. The testing platform application can allow a user to execute a test application locally or remotely. For example, the testing platform can be configured with one or more flags that a user can specify to indicate where the test application should be executed. If remote execution is specified an identifier for the remote device can be supplied.

Upon determining that the test application should be executed on a remote device, the testing platform can automatically identify test environment data. The test environment data can include such information as the installation location, e.g. absolute or relative file path; one or more test input files; installation location(s) for the one or more test input files; configuration settings; and/or any other automatically discoverable data relevant to the execution of the test application.

After identifying the test environment data, the testing platform can transmit the test and the test environment data to the remote device. In some cases, prior or in conjunction with transmitting the test and test environment data, the testing platform may be required to supply user log in credentials. The user credentials can be obtained in a number of different ways, such as through a command line option, a file on the first device, contained in the test application, etc.

Using the test environment data, the testing platform can cause the test application to be installed on the second device in a manner that minors the installation on the first device. That is, the test application can be installed on the second device such that executing the test application on the second device replicates running the test application on the first device.

Once the test application is installed and the environment configured, the testing platform can cause the second device to execute the test application. For example, the first device can transmit a run command to the second device. As the test application executes on the second device, the results can be displayed on the first device.

Figure 2:
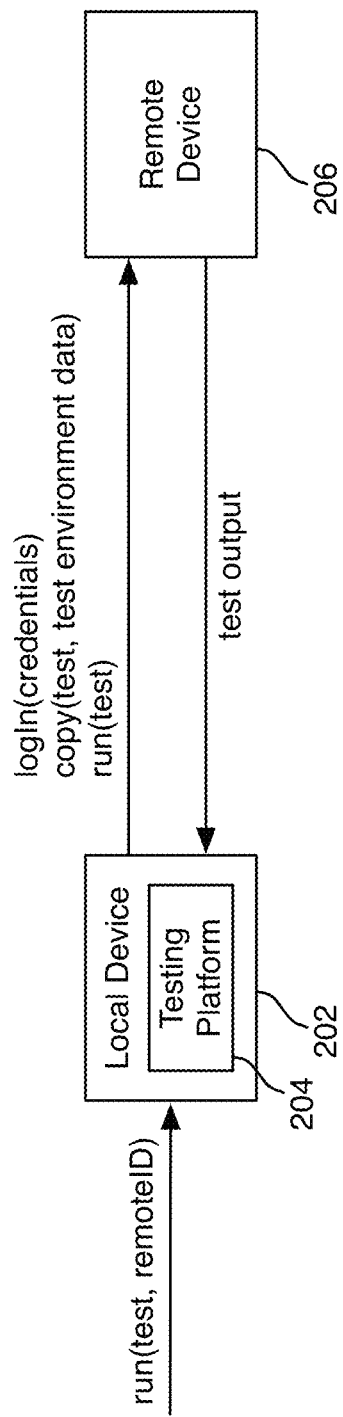
FIG. 2 illustrates an exemplary exchange of information during an automatic test execution on a remote device.

FIG. 2 illustrates an exemplary configuration of first and second devices for automatically executing a test application on a second device. Local device 202 can be configured with testing platform application 204. At some point, testing application 204 can receive a request to run a test application. The request can specify the test application as well as an indication that the test should be executed on a remote device, such as remote device 206. Remote device 206 can be connected to local device 202 using a variety of techniques, such as a wide-area network connection, a local area network connection, Bluetooth, a direct cable connecting the two devices, etc.

In response to the request to execute the test on the remote device, test platform 204 can identify the test environment data and establish a connection with the remote device. In some cases, establishing a connection can require supplying log in credentials. Once the connection is established, test platform 204 can transmit the test application and test environment data to the remote device. For example, testing platform 204 can issue a copy command that transfers the test application to the remote device and stores it at a location specified in the test environment data. After the test application has been installed on the remote device, the testing platform can cause the remote device to execute the test application. For example, testing platform 204 can transmit a run command to the remote device specifying the test application, as well as any necessary parameters, such as input files or settings.

As the program executes on the remote device, the output from the test application can be displayed on the local device. For example, the test output data can be transmitted back to the local device or reflected in a user interface window that displays the remote device's execution environment, such as a terminal window.

Figure 3:
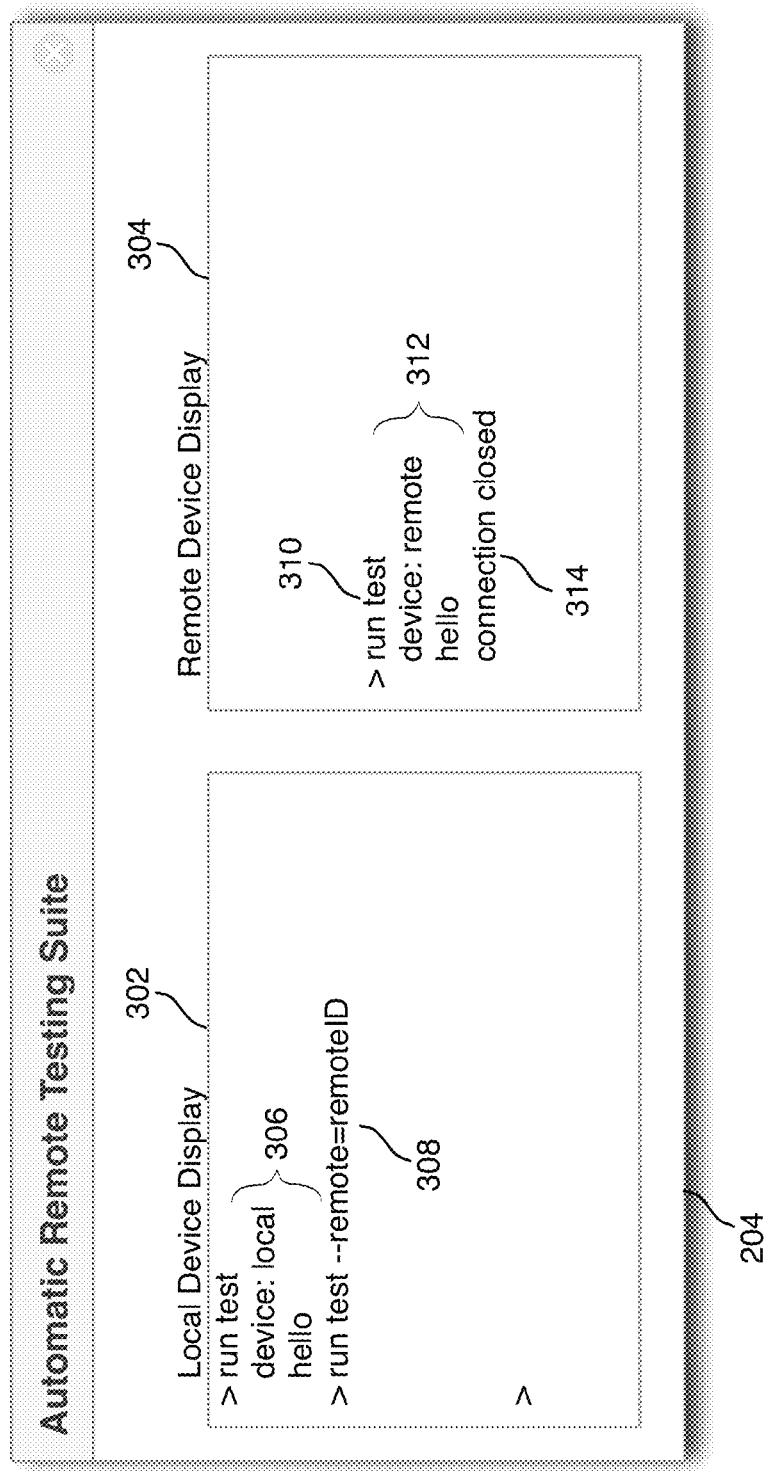
FIG. 3 illustrates an exemplary user interface for an automatic test execution on a remote device.

FIG. 3 illustrates an exemplary user interface for a testing platform, such as testing platform 204 in FIG. 2. Testing platform 204 can include two sub-windows 302 and 304 to display the execution environment of the local device and the remote device, respectively. In this example, testing platform 204 is executing a simple test application that simply prints the name of the device on which the test application is executing and "hello." Initially, the test application is run on the local device as reflected in test output 306 in local device display 302. Next, the same test application is invoked as a remote test, as reflected in command line instructions 308. In response to command line instructions 308, testing platform 204 gathers the test environment data and establishes a connection with the remote device. The test application is installed on the remote device based on the test environment data. Then testing platform 204 issues a command to the remote device to run the test, as reflected in command line instruction 310 in remote device display 304. The results of executing the test are displayed in remote device display 304. In this case, test output 312 reflects that the test was executed on the remote device. Finally, after the test completes, testing platform 204 can close the connection with the remote device.

In some cases, establishing a connection to the remote device can occur prior to receiving a command to execute a test application. For example, testing platform 204 can receive a specific request to establish a connection with a particular remote device. After the connection is established, testing platform 204 can receive one or more commands to execute one or more test applications on the remote device. The connection to the remote device can remain open until testing platform 204 receives an explicit request to close the connection.

In some cases, a first device and second device may be of differing platforms or running different operating systems. In this case, the format of one or more data items in the test environment data may be different for the different devices. It may still be desirable to be able to automatically execute a test application on the second device. To accomplish this, the testing platform can be configured to translate the test environment data from a first format suitable for the first device to a second format suitable for the second device. For example, a file path on a first device may use "/" to separate the different levels of the file path, while a file path on the second device may use "\". In this case, the testing platform can translate the file path by replacing "/" with "\".

Figure 4:
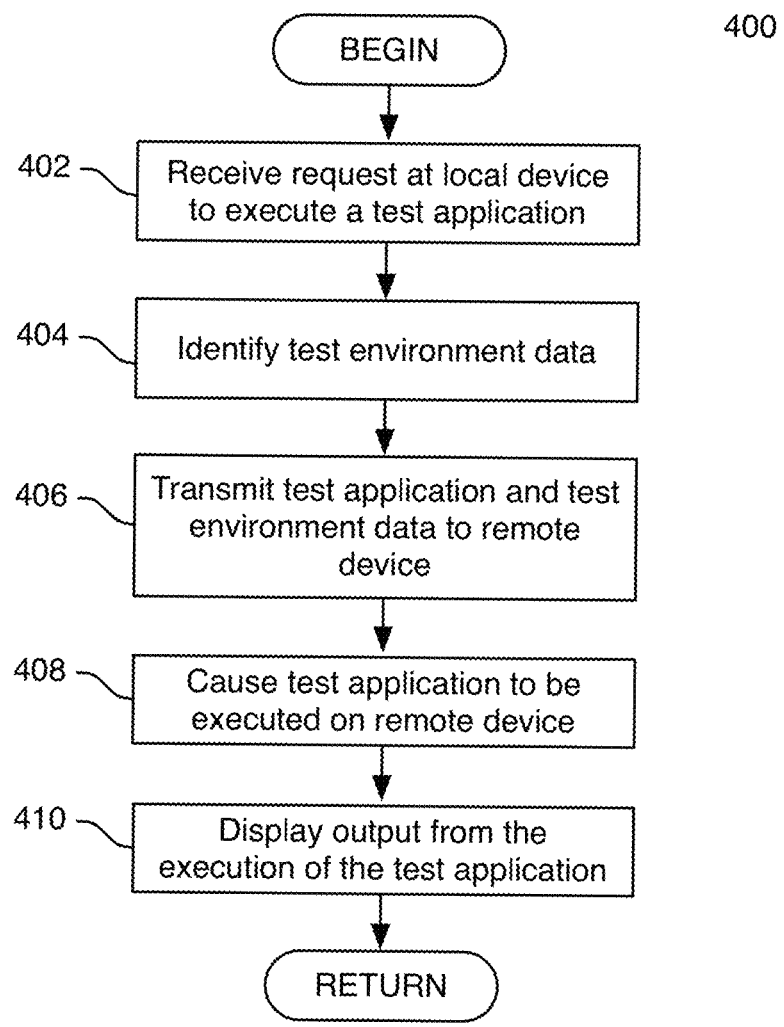
FIG. 4 illustrates an exemplary first method embodiment.

FIG. 4 is a flowchart illustrating an exemplary method 400 for automatically executing a test application on a remote device. For the sake of clarity, this method is discussed in terms of an exemplary device configuration such as is shown in FIG. 2. Although specific steps are shown in FIG. 4, in other embodiments a method can have more or less steps than shown.

The automatic execution of a test application on a remote device begins when testing platform 204 on a local device receives a request to execute a test application (402). In some cases, the request can specify a remote device, such as when a connection to a remote device has not yet been established. After receiving the request, testing platform 204 identifies test environment data (404). In some cases, a test environment data item can be obtained from a command line parameter, such as a test input file. However, testing platform 204 can also automatically determine one or more test environment data items based on the test environment of the local device. For example, testing platform 204 can identify the installation location for the test application based on the installation location on the local device. In another example, testing platform 204 can determine configuration settings from a configuration file on the local device.

Once testing platform 204 has identified test environment data, testing platform 204 can transmit the test application and the test environment data to the remote device (406) where the test application can be installed based on the test environment data. For example, the test application can be installed on the remote device based on a installation location specified in the test environment data. In another example, the test environment data can specify one or more test input files and their installation location.

After the test application and any supporting data has been installed on the remote device, testing platform 204 can cause the test application to be executed on the remote device (408). For example, testing platform can send a run command to the remote device. As the test application executes on the remote device, the output from the test application can be displayed in testing platform 204 on the local device (410), such as through a user interface similar to FIG. 3. After completing step 410, the computing system can resume previous processing, which can include repeating method 400.

Figure 5:
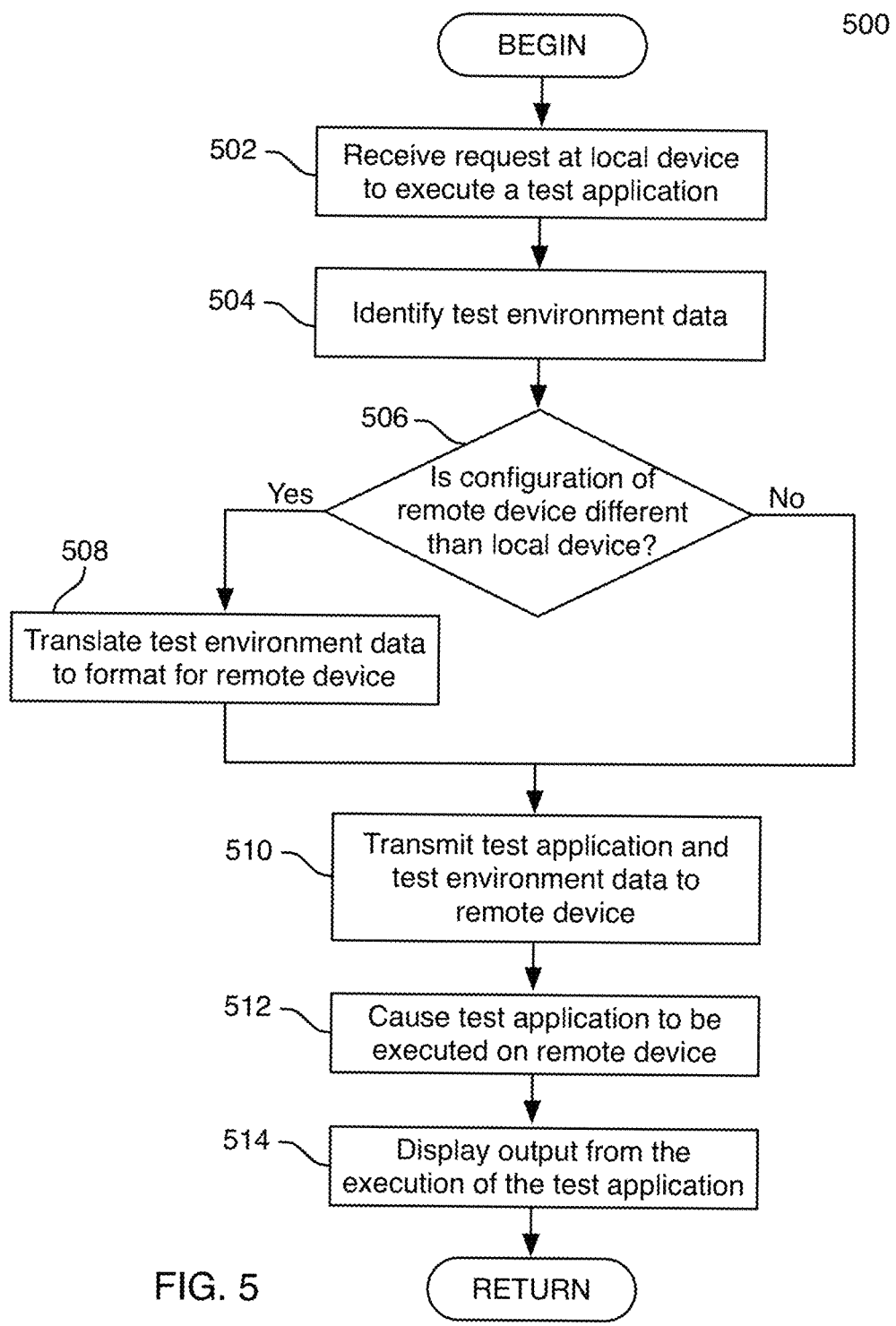
FIG. 5 illustrates an exemplary second method embodiment.

FIG. 5 is a flowchart illustrating an exemplary method 500 for automatically executing a test application on a remote device. For the sake of clarity, this method is discussed in terms of an exemplary device configuration such as is shown in FIG. 2. Although specific steps are shown in FIG. 5, in other embodiments a method can have more or less steps than shown.

The automatic execution of a test application on a remote device can begin when testing platform 204 receives a request to execute a test application (502). In some cases, the request can specify a remote device, such as when a connection to a remote device has not yet been established. Alternatively, prior to receiving the request to execute the test application, testing platform 204 may receive a request to establish a connection with the remote device.

After receiving the request to execute the test application, testing platform 204 can identify test environment data (504). In some cases, a test environment data item can be obtained from a command line parameter, such as a test input file. However, testing platform 204 can also automatically determine one or more test environment data items based on the test environment of the local device. For example, testing platform 204 can identify the installation location for the test application based on the installation location on the local device. In another example, testing platform 204 can determine configuration settings from a configuration file on the local device.

Once testing platform 204 has identified test environment data, testing platform 204 can determine whether the local device and the remote device have different configurations (506), such as when the two devices are executing different operating systems. If the two devices are different, testing platform 204 can translate any test environment data items that require a different format on the remote device (508).

Once the test environment data is in a proper format for the remote device, testing platform 204 can transmit the test application and the test environment data to the remote device (510) where the test application can be installed based on the test environment data. For example, the test application can be installed on the remote device based on a installation location specified in the test environment data. In another example, the test environment data can specify one or more test input files and their installation location.

After the test application and any supporting data has been installed on the remote device, testing platform 204 can cause the test application to be executed on the remote device (512). For example, testing platform can send a run command to the remote device. As the test application executes on the remote device, the output from the test application can be displayed in testing platform 204 on the local device (514), such through a user interface similar to FIG. 3. In some cases, after the test application has completed execution, testing platform 204 can close the connection with the remote device. Alternatively, after one or more test applications have been executed on the remote device, testing platform 204 can receive a request to close the connection with the remote device. After completing step 514, the computing system can resume previous processing, which can include repeating method 500.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving, at a first device, a request to execute a test application on a remote device, wherein the first device is executing a first operating system and the remote device is executing a second operating system;

identifying, via a processor, test environment data from the first device, the test environment data including an installation location for the test application at the first device and one or more configuration settings;

translating the test environment data from a first format for the first operating system to a second format for the second operating system;

transmitting the test application and the translated test environment data from the first device to the remote device for installation of the test application, wherein installation of the test application on the remote device is based on the translated test environment data from the first device to identify an installation location on the remote device and mirrors installation on the first device; and causing the test application to be executed on the remote device based on the translated test environment data, wherein execution of the test application on the remote device replicates execution of the test application on the first device.

2. The method of claim 1 further comprising:
displaying on the first device an output of the execution of the test application on the remote device.

3. The method of claim 1, wherein causing the test application to be executed further comprises:
transmitting a run command to the remote device.

4. The method of claim 1, wherein the test environment data further includes at least one test input file.

5. The method of claim 1, wherein the request further includes at least one of an identifier for the remote device or user credentials for the remote device.

6. The method of claim 5, wherein transmitting the test application and the test environment data further comprises:
logging in to the remote device using the user credentials.

7. The method of claim 1 further comprising:
prior to receiving the request to execute the test application on the remote device, receiving a first request to establish a connection with the remote device; and
after causing the test application to execute on the remote device, receiving a final request to close the connection with the remote device.

8. A testing platform comprising:
a non-transitory computer-readable storage medium; and
a computer executable instruction stored on the non-transitory computer- readable storage medium which, when executed by a computing device, causes the computing device to perform a method comprising:
receiving, at a first device, a request to execute a test application on a remote device, wherein the first device is executing a first operating system and the remote device is executing a second operating system;
in response to the request, automatically identifying test environment data from the first device, the test environment data including an installation location for the test application at the first device and one or more configuration values;
translating the test environment data from a first format for the first operating system to a second format for the second operating system;
issuing a copy command that transfers the test application and the translated test environment data from the first device to the remote device for installation of the test application and stores the test application at a location specified in the translated test environment data, wherein installation of the test application on the remote device is based on the translated test environment data from the first device and mirrors installation on the first device; and
causing the test application to be executed on the remote device based on the translated test environment data, wherein execution of the test application on the remote device replicates execution of the test application on the first device.

9. The testing platform of claim 8, wherein transferring the test application and the test environment data further comprises:
causing the one or more configuration values to be set on the remote device based on configuration information specified in the test environment data.

10. The testing platform of claim 8 further comprising:
displaying on the first device an output of the execution of the test application on the remote device.

11. The testing platform of claim 8, wherein causing the test application to be executed further comprises:
transmitting a run command to the remote device.

12. A system comprising:
a processor;
a first module configured to control the processor to receive, at a first device, a first request to execute an application on a remote device, wherein the first device is executing a first operating system and the remote device is executing a second operating system;
a second module configured to control the processor to, in response to the first request, automatically identify first environment data from the first device wherein the first environment data including a first installation location for the application at the first device and one or more configuration settings, and translating the first environment data from a first format for the first operating system to a second format for the second operating system;
a third module configured to control the processor to transmit the application and the translated first environment data to the remote device for installation of the application, wherein the installation of the application on the remote device is based on the translated first environment data from the first device to identify an installation location on the remote device and mirrors installation on the first device; and
a fourth module configured to control the processor to cause the application to be executed on the remote device based on the translated first environment data, wherein execution of the application on the remote device replicates execution of the application on the first device.

13. The system of claim 12 further comprising:
a fifth module configured to control the processor to display a graphical user interface presenting a first execution environment and a second execution environment, the first execution environment displaying local execution output and the second execution environment displaying execution output of the application on the remote device.

14. The system of claim 12 further comprising:
a fifth module configured to control the processor to establish a connection to the remote device, wherein establishing the connection occurs prior to receiving the first request to execute the application on the remote device.

15. The system of claim 14 further comprising:
the first module configured to control the processor to receive a second request to execute the application on the remote device;

the second module configured to control the processor to automatically identify second environment data, in response to the second request, the second environment data including a second installation location for the application;
the third module configured to control the processor to transmit the application and the second environment data to the remote device; and
the fourth module configured to control the processor to cause the application to be executed on the remote device based on the second environment data.

16. The system of claim 14 further comprising:
a sixth module configured to control the processor to close the connection with the remote device, wherein closing the connection occurs after causing the application to execute on the remote device.

\* \* \* \* \*